Aug. 9, 1949.  J. H. WIGGINS  2,478,730
SEALING DEVICE FENDER FOR FLUID CONTAINERS
Filed Dec. 24, 1943  2 Sheets-Sheet 1
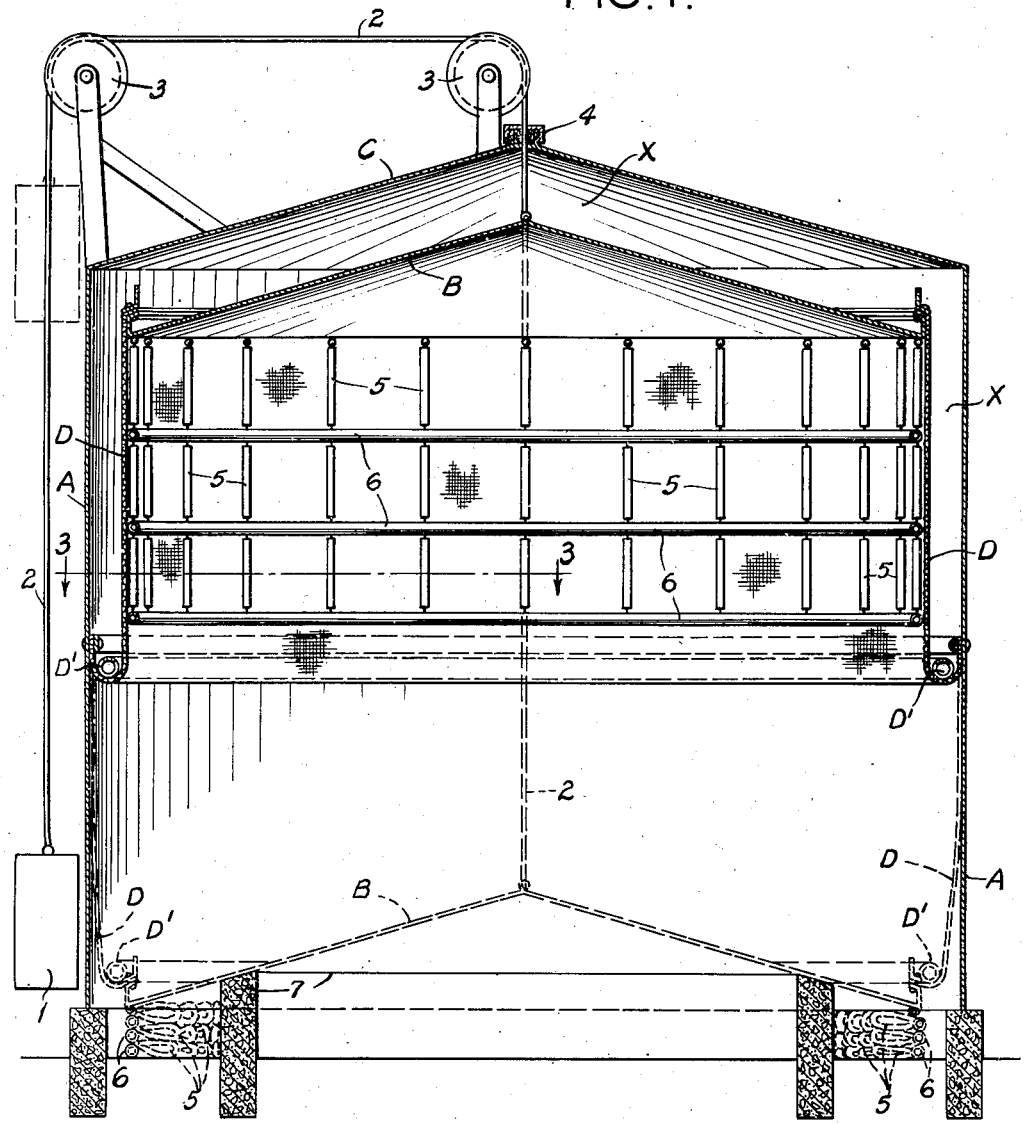
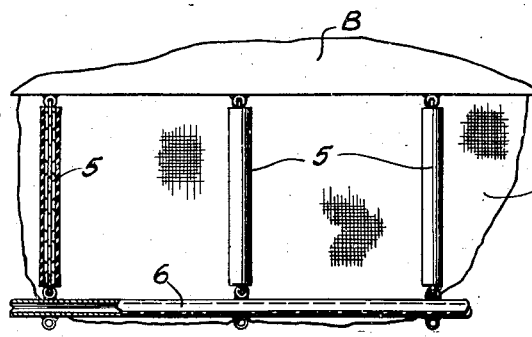
INVENTOR:
JOHN H. WIGGINS
BY *Wellsl Church*
ATTORNEY Aug. 9, 1949.　　　　　J. H. WIGGINS　　　　　2,478,730
SEALING DEVICE FENDER FOR FLUID CONTAINERS
Filed Dec. 24, 1943　　　　　　　　　　　　　2 Sheets-Sheet 2
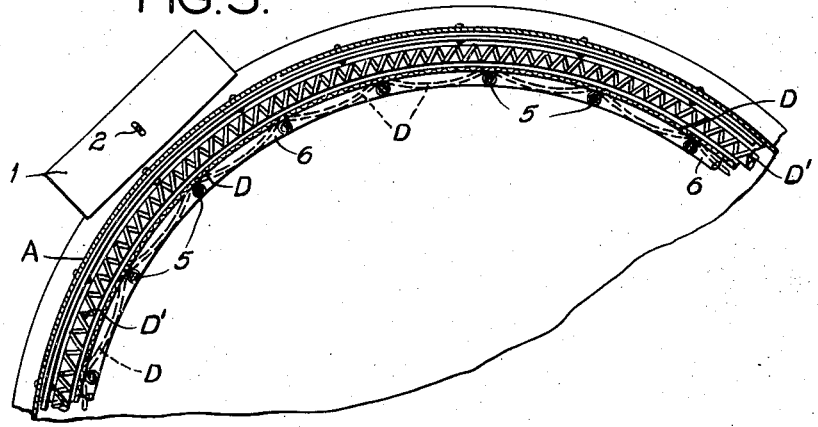
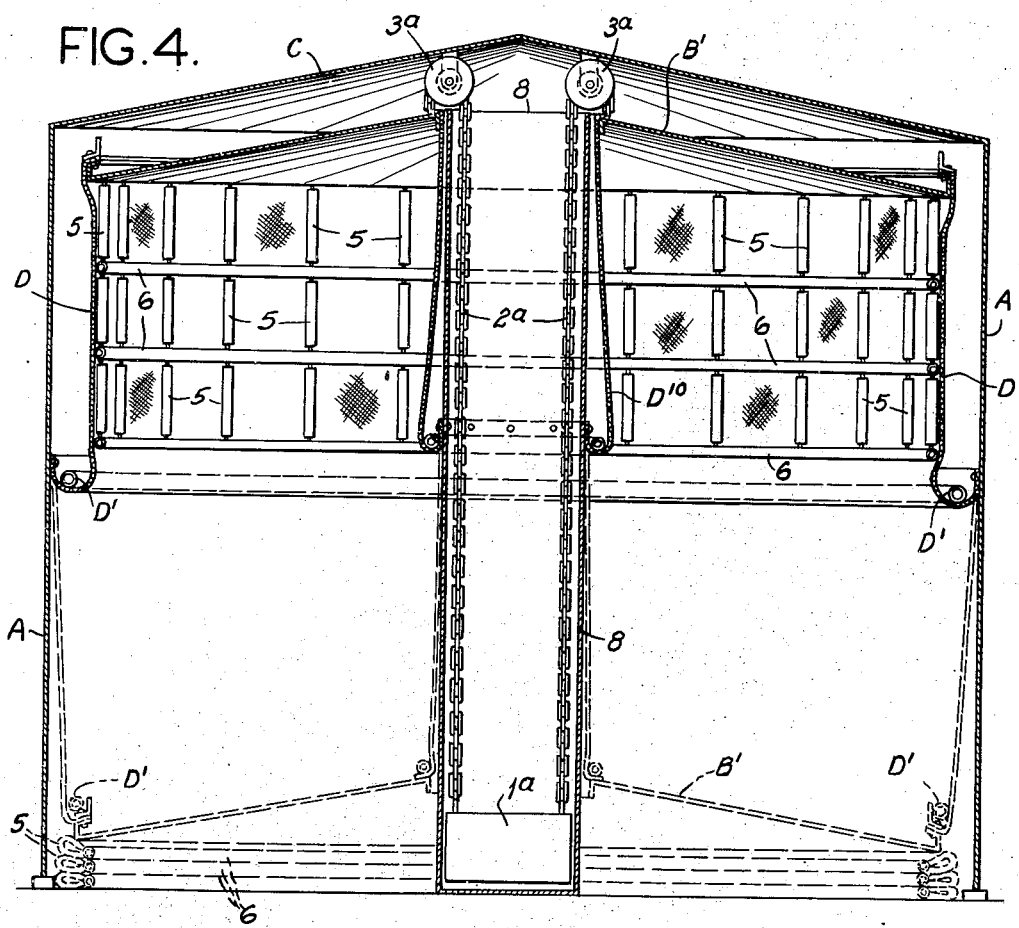
INVENTOR:
JOHN H. WIGGINS
BY Wells R. Church
ATTORNEY Patented Aug. 9, 1949

2,478,730

UNITED STATES PATENT OFFICE 2,478,730

SEALING DEVICE FENDERS FOR FLUID CONTAINERS

John H. Wiggins, Chicago, Ill.

Application December 24, 1943, Serial No. 515,613

2 Claims. (Cl. 48—178)

This invention relates to fluid storage apparatus of the particular type or kind that comprise a tank or container, a vertically-movable member in said container that forms one horizontal, or substantially horizontally-disposed wall of a storage chamber of variable volume, and a flexible sealing element made of gas-tight fabric, or other suitable material, attached to the side wall of the container and to the vertically-movable member, so as to hang suspended from said member when said member rises and falls. Apparatus of the kind above referred to are shown in my U. S. Patents Nos. 2,050,685 and 2,050,686, dated August 11, 1936; No. 2,102,299, dated December 14, 1937; and in my co-pending application Serial No. 363,835, filed November 1, 1940, now U. S. Patent No. 2,363,565, dated November 28, 1944.

One object of my present invention is to provide a novel means for controlling, regulating, or governing the general shape of form of the flexible sealing element of an apparatus of the general type or kind above mentioned, during the rise and fall of the vertically-movable member to which said sealing element is attached.

Another object is to provide an efficient means of simple design and novel construction, for preventing the flexible sealing element of such an apparatus from bulging or bellying excessively, in instances where said element is subjected to a force, pressure, or load tending to flex it inwardly away from the side wall portion of the tank or container of the apparatus.

Another object is to provide a sealing element control or governing means of the kind above mentioned, that will automatically collapse into an inactive condition, where it takes up very little space below the vertically-movable member of the apparatus when said member reaches the end of its downward stroke, and which will progressively unfold and assume the form of a fender, barrier, or fence that restricts inward flexing of the sealing element, while said vertically-movable member is traveling upwardly.

Another object is to provide a control or governing means for the flexible sealing device of an apparatus of the kind mentioned, that will not interfere with the proper flexing of said sealing device, or rub on said device in such a way as to injure or form holes in the same.

And still another object of my invention is to provide a sealing element control means, which, in addition to preventing bulging or bellying of the sealing element, also causes said element to assume a predetermined shape or form, free from random wrinkles, when the vertically-movable member of the apparatus is at the end of its stroke in one direction, and the sealing element is in a distended condition.

The accompanying drawings are intended to illustrate the principle of operation of my invention and show how the invention may be applied either to a gas holder or to a liquid storage apparatus provided with a vertically-movable member such as a "piston" or "floating roof," and equipped with a sealing means for said vertically-movable member that comprises a flexible sealing element attached to said vertically-movable member, so as to hang downwardly from same when said member rises, the term "fluid" being herein used to cover both gases and liquids.

Figure 1 is a fragmentary vertical transverse sectional view of an apparatus embodying my invention.

Figure 2 is a fragmentary elevational view of the collapsible fender or barrier that is used to prevent excessive bulging or bellying of the sealing element attached to the peripheral edge of the vertically-movable member of the apparatus.

Figure 3 is a fragmentary horizontal sectional view, taken on the line 3—3 of Figure 1; and Figure 4 is a vertical transverse sectional view, illustrating my present invention, applied to a gas holder of the particular kind disclosed in my previously mentioned pending application Serial No. 363,835.

In the accompanying drawings, A designates a stationary tank or container, and B designates a vertically-movable member, that is arranged inside of said container so as to co-operate with a portion C of the container to form a chamber X of variable volume, in which a fluid is stored. The portion C of the container that is arranged in opposed relation to the vertically-movable member B, may constitute either the top wall or the bottom wall of the storage chamber X. The space or joint between the peripheral edge of the vertically-movable member B, and the stationary side wall portion of the container A is sealed by a flexible element D attached to the peripheral edge of the vertically-movable member B and to the side wall portion of the container, so as to hang suspended from the underside of the member B when said member rises and falls. The sealing element D, which is preferably constructed of gas-tight fabric, is usually attached to the side wall of the container near the middle of said wall, and is made of such shape and dimensions that said element will assume the shape or form of a downwardly hanging loop during the travel of the member B from one of its extreme positions to its other extreme position. To insure that the loop of said sealing element will hang downwardly, or, in other words, with the closed portion of the loop positioned at the lower end of the loop, a means D' is preferably combined with the element D, so as to tend to hold said element in a downwardly-looped condition. Said means D' may consist of anything that will exert a load, downward force, or pressure, on the closed lower end of the loop of the sealing element D. It is herein illustrated as consisting of an annular member, made of a coiled metal rod or wire, that extends circumferentially around the sealing element D.

In order to prevent the sealing element D from bulging or bellying excessively, due to pressures or forces tending to flex it inwardly away from the side wall of the container, I suspend from the vertically-movable member B, a structure that functions as a barrier, fender, or fence for the sealing element D when said vertically-movable member is moving upwardly and is at the end of its upward stroke, and which, during the downward stroke of the member B, collapses into an inactive position.

In the case of a gas holder, the part previously referred to as a vertically-movable member B, would consist of a piston that reciprocates in a container A, whose side wall portion is closed at its upper end by a roof C that co-operates with the piston to form a gas storage space or chamber X, the sealing element D being attached to the side wall of the container and to the peripheral edge of the piston. Figure 1 illustrates the piston B as being balanced by a counterweighting mechanism that comprises a weight 1 attached to a chain or cable 2 that leads upwardly from the weight over pulleys or sheaves 3 carried by the roof C, and then downwardly to the piston B through a stuffing box 4 in said roof. The barrier, fender, or fence, previously referred to, is herein illustrated as being formed by a group of substantially rigid, annular, horizontally-disposed compression members 6 carried by a plurality of groups of flexible supporting devices 5, such as chains or cables, suspended from the peripheral edge of the piston B at a point between the sealing element D and the center of the piston. The flexible supporting devices 5 are arranged in spaced relation, around the peripheral edge of the piston, as shown in Figure 2, and when the piston is in its extreme elevated position, as shown in full lines in Figure 1, the compression members 6 are disposed in superimposed relation, or one above the other in vertical alignment with each other. During the downward movement of the piston, the fender, barrier, or fence formed by the parts 5 and 6, collapses vertically and assumes a completely collapsed or inactive condition, by the time the piston reaches the end of its downward stroke, as shown in broken lines in Figure 1.

As the piston starts to move upwardly, the part D' or equivalent means that exerts a downward load or weight on the sealing element D, causes said sealing element to assume the form of a downwardly-hanging loop, whose lower end is closed and whose side wall portions are suspended from the piston and from the side wall of the container A. During the upward travel of the piston, the topmost compression member 6 moves into operative relationship with the sealing element D, then the second compression member 6 moves into operative relationship with said sealing element, etc., with the result that by the time the piston reaches the end of its upward stroke, the sealing element D surrounds a group of superimposed, horizontally-disposed compression members that hang from the underside of the piston, and which effectively prevent said sealing element from bellying inwardly excessively, in the event an abnormal pressure or force exists or is created in the space between the sealing element D and the side wall portion of the container. So far as my invention is concerned, it is immaterial what causes the sealing element D to bulge or belly inwardly, but one thing that is liable to cause such excessive flexing of the sealing element D, is excessive friction of the working parts of the apparatus, tending to impede the movement of the piston. Excessive bulging or bellying might also be caused by storing gases in the chamber D at a pressure considerably above atmosphere.

In addition to effectively preventing the flexible sealing device of the apparatus from excessive bulging or bellying, due to an abnormal force or pressure being exerted on same, a baffle, barrier, or fender of the kind above described causes the sealing element D to assume a definite wave shape around its entire circumference, as shown in Figure 3, when the piston is at the end of its upward stroke and said sealing element is in a distended condition. This is highly advantageous, as it permits the effective circumference of the sealing element D to be reduced without liability of said element folding over on itself in large wrinkles, or causing an accumulation of wrinkles which might strain the fabric of which the element D is constructed. Nor does such a means have a tendency to wear holes in the flexible element D when the piston rises and falls, owing to the fact that said means is of such construction and arrangement, that after it has been engaged by the element D, there is no relative vertical motion between said element and said means, but instead, the contacting parts of the sealing element D and the compression members 6 and flexible supporting devices 5, travel in the same direction at the same speed. As previously intimated, my invention is applicable to an apparatus in which the fluid being stored is confined on the underside of the vertically-movable member of the apparatus.

In Figure 4 of the drawings I have illustrated my invention embodied in a gas holder of the kind illustrated in my pending application Serial No. 363,835, which is provided with a piston B' having a center opening, up through which extends a tubular roof supporting member 8 that assists in supporting the roof of the container and also carries sheaves $3^a$, over which travel chains or cables $2^a$ attached to a counterweight $1^a$ housed by said tubular center member 8. An additional flexible sealing device $D^{10}$ is used to seal the space or joint between the piston and the central supporting member 8, but in such a structure the center sealing element $D^{10}$ is of such size and arrangement that it has no tendency to bulge or belly excessively.

Having thus described my invention, what I claim as new and desire to secure by Letters Patent is:

1. An apparatus for storing fluids, comprising a container provided with a side wall, a vertically-movable piston in said container that forms one wall of a storage chamber of variable volume, a flexible, curtain-like sealing element attached circularly at one of its edges to the side wall of the tank and at its other edge to the periphery of the piston, so that in all positions of the piston said sealing element extends downwardly from its line of attachment to the tank wall, over, and upwardly to its line of attachment to said piston, and a substantially rigid, horizontally-disposed, annular member suspended by a flexible means from the underside of the piston circumferentially between the center of the piston and said curtain-like sealing element and disposed so as to take up forces or pressures exerted on said sealing element in a direction tending to cause said element to bulge inwardly excessively away from the side wall of the container.

2. An apparatus for storing fluids, comprising a container provided with a side wall, a vertically-movable piston in said container, a flexible, curtain-like sealing element attached circularly at one of its edges to the side wall of the tank and at its other edge to the periphery of the piston, so that in all positions of the piston said sealing element extends downwardly from its line of attachment to the tank wall, over, and upwardly to its line of attachment to said piston, and a vertically-collapsible barrier positioned beneath the piston and composed of a plurality of superimposed, horizontally-disposed, substantially rigid, annular members joined together by flexible devices that permit said annular members to move into closely spaced relationship during vertical movement of the piston in one direction and to move into relatively widely spaced relationship during movement of the piston in the opposite direction, the uppermost of said annular members being suspended by a flexible means from the underside of the piston.

JOHN H. WIGGINS.

REFERENCES CITED

The following references are of record in the file of this patent:

UNITED STATES PATENTS

| Number | Name | Date |
|---|---|---|
| 1,911,462 | Neal | May 30, 1933 |
| 2,102,299 | Wiggins | Dec. 14, 1937 |

FOREIGN PATENTS

| Number | Country | Date |
|---|---|---|
| 4,790 | Great Britain, 1823 | Nov. 8, 1823 |